Patented Sept. 23, 1941

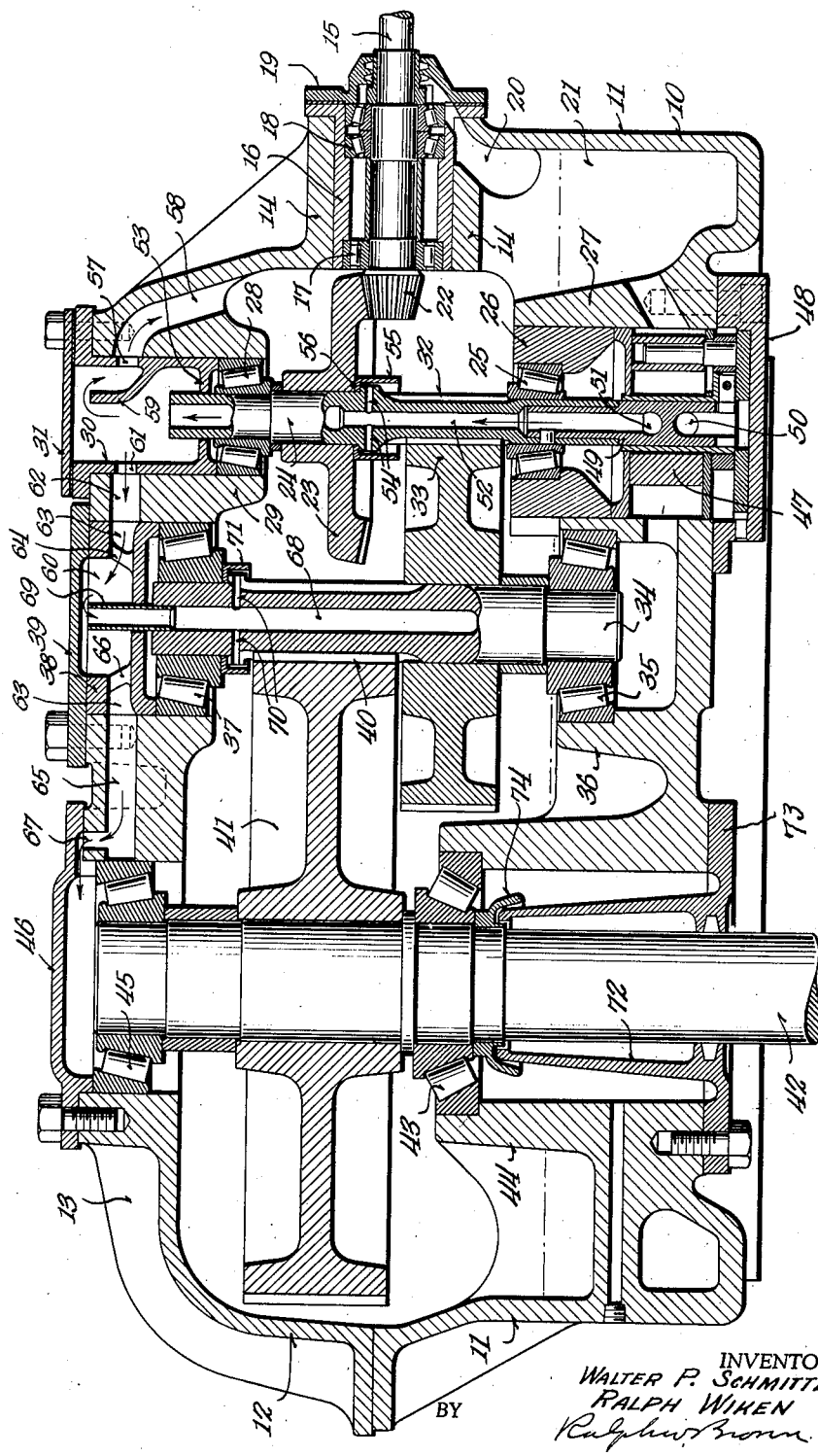

2,256,754

UNITED STATES PATENT OFFICE 2,256,754

SPEED REDUCER

Walter P. Schmitter, Wauwatosa, and Ralph Wiken, Milwaukee, Wis., assignors to The Falk Corporation, Milwaukee, Wis., a corporation of Wisconsin Application November 21, 1938, Serial No. 241,536

8 Claims. (Cl. 184—6)

This invention relates to speed reducers of the vertical shaft type and particularly to lubrication systems therefor.

Speed reducers of the type mentioned are ordinarily equipped with a lubrication system by which lubricant is distributed under pressure from a pump to various moving parts. Such a system is entirely satisfactory for a speed reducer operated at certain speeds but, at speeds quite lower, delivery from the pump may prove inadequate, while at higher speeds, the delivery becomes excessive, both as to volume and pressure, thereby lowering the overall efficiency of the unit.

An object of the present invention is to provide a pump fed lubrication system for speed reducers of the type mentioned which is equally effective and efficient at all speeds. This we have accomplished by a novel arrangement of parts by which pressure may be substantially eliminated from the system.

Other more specific objects and advantages will appear, expressed or implied, from the following description of a speed reducer equipped with a lubrication system embodying the present invention.

The single figure of the accompanying drawing is a vertical sectional view of a vertical right-angle speed reducer having a lubrication system designed and arranged in accordance with the present invention.

The speed reducer shown is completely enclosed in a housing having a base portion 10 with an upstanding rim 11 flanged to receive a mating flanged rim 12 of a cover portion 13.

At one end the base and cover portions are fashioned to form upper and lower mating semi-cylindrical portions 14 cooperating to form a split hub for a horizontal high speed shaft 15. A flanged cartridge 16, removably fixed within the hub, carries appropriate anti-friction bearings 17 and 18 for the shaft 15. The inner end of the cartridge 16 is open to the interior of the housing for a purpose which will later appear, and the outer end is closed by a removable cover 19 except for a drain duct 20 which is directed toward the main lubricant reservoir 21 provided in the base portion of the housing.

A bevel pinion 22, fixed to rotate with the shaft 15, meshes with and drives a bevel gear 23, fixed to rotate with a shaft 24 vertically arranged within the housing. Shaft 24 is supported primarily by an appropriate combined thrust-and-radial bearing 25, adjacent its lower end, the bearing being mounted in a cylindrical hollow block 26 fixed in the top of a rigid hub 27 which extends upward from the bottom of the housing through and above the body of lubricant therein. The dot-and-dash line indicates the normal lubricant head. The hub 27 and block 26 thus separate the bearing 25 from contact with the body of lubricant in the main reservoir so as to avoid friction-producing churning of the lubricant therein.

The upper end of shaft 24 is supported by an appropriate bearing 28, seated in the lower end of a hub 29 depending from the top of the housing, and positioned by a cylindrical shell 30 to be later described in more detail. The shell 30 is retained by an appropriate cover plate 31 removably attached to the housing cover. The shaft 24 also carries a pinion 32, formed thereon below the gear 23, which meshes with a gear 33 fixed to rotate with a second vertical shaft 34. Shaft 34 is supported primarily by a combined thrust-and-radial bearing 35 seated in an upstanding hub 36 projecting from the bottom of the housing. It will be noted that in this instance the bearing 35 is below the lubricant level and is therefore immersed in the bath of lubricant and directly lubricated thereby. This is entirely practicable because it and the shaft supported thereby rotate at a speed much lower than that of shaft 24.

The shaft 34 is also supported by a bearing 37 at its upper end which is in an appropriate opening in the cover portion 13 below a cylindrical spacer block 38 to be later described in greater detail. The block is retained by an appropriate cover plate 39 removably attached to the cover portion.

Shaft 34 also carries a pinion 40, formed thereon above the gear 33, which meshes with and drives a large gear 41 fixed to rotate with a vertical low speed shaft 42, which in this instance projects downwardly through the bottom of the housing and constitutes the power-take-off shaft.

Shaft 42 is supported primarily by a combined thrust-and-radial bearing 43 disposed immediately below the gear 41 and seated in a hollow hub 44 which extends above the lubricant level so as to avoid loss of lubricant from the reservoir through the lower shaft outlet. This shaft is additionally supported at its upper end by a bearing 45, seated in an appropriate opening in the cover portion 13 and positioned by a suitable flanged cover 46 removably attached to the cover portion.

The speed reducer above described is equipped with a novel lubrication system which will now be described. It includes a suitable pump 47 preferably arranged in the base portion of the housing below the level of lubricant therein so as to receive its supply of lubricant by gravity from the main reservoir 21 and preferably driven by one of the shafts in the unit.

In this instance the pump, indicated at 47, is of a novel type fully disclosed in the copending application of Ralph Wiken, Serial No. 229,438. It is shown mounted in the lower end of the hub 27 immediately below the bearing block 26 and retained by a suitable bottom cover plate 48 removably attached to the bottom of the housing. It is driven by the shaft 24 through a rotary pintle 49 fixed to the shaft. The pintle contains a port 50 through which the pump is supplied with lubricant from the reservoir 21 and a port 51 through which the pump delivers lubricant into a vertical channel 52 in the shaft 24 regardless of the direction of rotation of the shaft and pintle.

The shaft 24 projects loosely through the bottom 53 of the shell 30 and the channel 52 extending upward through the shaft supplies the shell with lubricant from the pump.

Leakage of lubricant from the shell 30 through the slight clearance between its bottom 53 and the shaft 24 provides adequate lubrication for the shaft bearing 28 immediately therebelow.

Immediately above the pinion 32, the shaft 24 is provided with narrow open ended radial ducts 54 which communicate with the lubricant conducting channel 52 and discharge lubricant therefrom outward toward a surrounding shroud 55 spaced therefrom. The shroud 55 is suspended from an upper end flange 56 fixed to the shaft above the ducts 54 and is so positioned as to direct lubricant issuing therefrom downward over the pinion 32 thereby to adequately lubricate the pinion and its mating gear 33, and ultimately the lower shaft bearing 25.

The shell 30 is provided with an outlet port 57 which communicates with a channel 58 directed downward toward the bevel pinion 22 and through which ample lubricant is supplied to the pinion 22 and its mating gear 23 to lubricate the intermeshing teeth thereof. Some of the lubricant discharged from the channel 58 also finds its way into the sleeve 16 to lubricate the bearings 17 and 18 of the high speed shaft 15.

The outlet port 57 of the shell 30 is situated behind a suitable dam 59 which together with another dam, referred to hereinafter, determines the level of lubricant in the shell, the port 57 and channel 58 receiving the overflow from the dam.

A chamber 60 within the spacer block 38 is in open communication with the interior of the shell 30, through a port 61 in the shell below the lubricant level therein, a channel 62 in the housing cover, an annular channel 63 formed in and encircling the block 38, and a port 64 in the block. The chamber 60 also communicates with a channel 65 in the housing cover, through a port 66 and the channel 63 in the block 38, the channel 65 having an upper outlet port 67 whose discharge end is at the same level with the dam 59 and which constitutes the second dam above mentioned.

The connected channel 65, chamber 60, and shell 30 together constitute an upper auxiliary lubricant reservoir in which the lubricant level is maintained constant during operation of the device regardless of the rate of operation of the device or of the pump or of the rate of delivery from the pump, and from which the various parts receive their required supply of lubricant by gravity and in a manner to avoid objectionable lubricant pressures.

The manner of conducting lubricant to the bearings and gears associated with the high speed shaft 15 and first intermediate speed shaft 24 has been explained. Delivery to other of the parts will now be described.

The second intermediate speed shaft 34 is provided with a central longitudinal vertical channel 68 communicating at its upper end with a tube 69 fixed to the shaft and projecting loosely through the bottom of the chamber 60 and upward to the lubricant level therein. It functions as a third dam over which lubricant may flow until the channel 68 is filled. Narrow radial ducts 70 in the shaft 34 above the pinion 40 communicate with the channel 68 and discharge outwardly toward a surrounding shroud 71 to lubricate the pinion 40 and gear 41 substantially in the manner above described for lubricating the pinion 32 and gear 33. Also the clearance between the tube 69 and bottom of the chamber 60 provides sufficient leakage from the chamber to adequately lubricate the upper shaft bearings 37.

The upper bearings 45 of the low speed shaft 42 are lubricated by overflow through the port 67 and the lower bearings 43 thereof are lubricated by lubricant thrown centrifugally or otherwise from the adjacent gear 33 or falling thereon from the upper bearings 45 through the gear 41.

To insure against leakage of lubricant downward along the shaft 42, the shaft is shown surrounded by a frustro-conical shield 72, which is supported by and extends upwardly from a removable bottom cover plate 73, and whose upper open end is sealed against the admission of lubricant by an overlying shield 74 fixed to and depending from the shaft 42.

Various changes may be made in the embodiment of the invention hereinabove specifically described without departing from or sacrificing the advantages of the invention as defined in the appended claims.

We claim:

1. In a speed reducer having a housing including base and cover portions, a plurality of horizontally spaced vertical shafts each journalled in both said base and cover portions, and a gear train connecting said shafts, a lubrication system therefor comprising a lubricant reservoir in the base portion of said housing, an auxiliary reservoir horizontally extended substantially from shaft to shaft in the cover portion of said housing, means for transmitting lubricant from said lubricant reservoir to said auxiliary reservoir, means including a dam for predetermining the level of lubricant in said auxiliary reservoir, and openings in said auxiliary reservoir permitting escape of lubricant onto said shafts and gear train.

2. In a speed reducer having a housing including base and cover portions, transmission mechanism therein including a horizontal drive shaft journalled in said housing, a plurality of horizontally spaced vertical shafts each journalled in both said base and cover portions, and a gear train connecting said horizontal and vertical shafts, a lubrication system therefor comprising a lubricant reservoir in the base portion of said housing, an auxiliary reservoir horizontally extended substantially from one vertical shaft to another in the cover portion of said housing, means supplied from said first named reservoir for supplying lubricant to said auxiliary reservoir, means including a plurality of dams for predetermining the level of lubricant in said auxiliary reservoir, portions of said transmission mechanism being positioned in the path of the over flow of lubricant from said dams for lubrication thereby.

3. In a speed reducer having a housing including base and cover portions, a plurality of horizontally spaced vertical shafts each journalled in both said base and cover portions, and a gear train connecting said shafts, a lubrication system therefor comprising a lubricant reservoir in the base portion of said housing, an auxiliary reservoir horizontally extended substantially from shaft to shaft in the cover portion of said housing, means supplied from said first named reservoir for delivering lubricant through one of said shafts into said auxiliary reservoir, and means including a channel in another of said shafts communicating with said auxiliary reservoir for supplying lubricant by gravity to portions of said gear train.

4. In a speed reducer having a housing including base and cover portions, a plurality of vertical shafts each journalled in both said base and cover portions, and a gear train connecting said shafts, a lubrication system therefor comprising a lubricant reservoir in said base portion, an auxiliary reservoir horizontally extended substantially from shaft to shaft in said cover portion, a channel in one of said shafts communicating with said auxiliary reservoir, a pump driven by said last mentioned shaft and supplied from said first named reservoir for delivering lubricant through said channel into said auxiliary reservoir, means including a dam for predetermining the level of lubricant in said auxiliary reservoir, and openings in said auxiliary reservoir permitting direct escape of lubricant by gravity onto said shafts and gear train.

5. A speed reducer comprising a housing including a base and cover, a plurality of vertical shafts therein, a portion of said cover extending from shaft to shaft and forming the bearing support for the upper ends of said shafts, said last named portion of the cover being shaped to provide a lubricant reservoir in said cover extending substantially from shaft to shaft for conducting lubricant to said shafts.

6. In a speed reducer the combination of a housing including a base portion having a lower lubricant reservoir therein and a cover portion having an auxiliary lubricant reservoir therein, a plurality of vertical shafts journalled in said base and cover portions and having portions above their upper bearings projecting into said auxiliary reservoir to thereby induce lubrication of the upper bearings of said shafts by leakage from said auxiliary reservoir, and means for supplying lubricant from said lower reservoir to said auxiliary reservoir.

7. In a speed reducer the combination of a housing including base and cover portions and having a lower lubricant reservoir in said base portion, said cover portion having a chamber extending vertically therethrough, a vertical shaft carrying a gear, a bearing for the upper end of said shaft seated within the lower end of said chamber to journal said shaft in said cover, a shell inserted in said chamber above said bearing to form an auxiliary lubricant reservoir in said cover, the bottom of said shell being fitted around said shaft to permit leakage of lubricant therebetween to lubricate said bearing, means supplying lubricant from said lower reservoir to said auxiliary reservoir, and means for supplying lubricant by gravity from said auxiliary reservoir to said gear to lubricate the same.

8. In a speed reducer the combination of a vertical shaft having an axial channel therein, a pinion carried by said shaft, means supplying lubricant to said channel, ducts piercing said shaft above said pinion to permit ejection of lubricant from said channel outwardly of said shaft, and a shroud surrounding said shaft and said ducts and spaced from said shaft to deflect the flow of lubricant from said ducts downwardly to said pinion.

WALTER P. SCHMITTER.
RALPH WIKEN.